United States Patent [19]

Butler

[11] Patent Number: 5,076,043
[45] Date of Patent: Dec. 31, 1991

[54] PADDED ELBOW PROTECTOR

[76] Inventor: Larry G. Butler, 243 Twin Oaks, Seguin, Tex. 78155

[21] Appl. No.: 624,585

[22] Filed: Dec. 10, 1990

[51] Int. Cl.⁵ .............................................. B68C 5/00
[52] U.S. Cl. ...................................................... 54/79
[58] Field of Search ............... 54/79, 80, 82, 65, 68, 54/81; 119/96, 143; 2/22, 23

[56] References Cited

U.S. PATENT DOCUMENTS

| | | | |
|---|---|---|---|
| 295,712 | 3/1884 | Andersen | 54/80 |
| 438,105 | 10/1890 | Geyer | 54/82 |
| 460,822 | 10/1891 | Hayward | 54/80 |
| 551,135 | 12/1895 | Morrill | 54/82 |
| 2,253,837 | 8/1941 | Augspurger | 54/82 |
| 2,443,831 | 6/1948 | Miller | 54/79 |
| 2,449,410 | 9/1948 | Polinsky | 54/82 |
| 3,331,083 | 7/1967 | Holly | 2/22 X |
| 3,747,565 | 7/1973 | Kellam | 54/82 |
| 3,791,383 | 2/1974 | Friedman | 119/96 X |
| 4,479,457 | 10/1984 | Rotolo | 119/143 |
| 4,622,697 | 11/1986 | Tajima | 2/23 |
| 4,633,817 | 1/1987 | Taylor | 119/96 |

Primary Examiner—Robert P. Swiatek
Assistant Examiner—Nicholas D. Lucchesi
Attorney, Agent, or Firm—G. Turner Moller

[57] ABSTRACT

A tapered padded sleeve is provided for each of the front legs of an animal, such as a dog. The sleeves extend over the dog's shoulders and a harness on the dog's back connects the sleeves together and supports the arrangement from the animal's back. The sleeves are padded and act to the protect the animal's front elbows during recovery from elbow callus pyoderma or bursitis or keep the animal's elbows from dehairing.

2 Claims, 1 Drawing Sheet

PADDED ELBOW PROTECTOR

This invention relates to a padded protector for the front elbows of animals, particularly dogs. It will help prevent elbow callus pyoderma and bursitis in animals wearing the protector or help animals recover from elbow injuries.

Animals sometimes get severe elbow problems and develop elbow callus pyoderma. This is typically caused by the front elbows rubbing and pressing on hard surfaces, such as the ground, hardwood floors, the bottom of dog houses, kennel cages and the like. Because of the pressure and friction, dogs in particular lose hair off the back of the front elbows and develop calluses. This may not be of any particular concern in an average mutt or pet, but many people take great pride in their dogs, particularly if the animal is of pure breed and is shown or bred. Kennel cages can quickly abrade hair off a dog's elbow. In one known experience, a five day kennel stay was sufficient to denude hair from a dog's front elbows.

Many animal owners try to keep the animals on soft surfaces with little success. Cushioned mats are often provided but the animal typically ends up laying elsewhere or pushing the mat aside, often preferring a cool, hard surface.

In an aggravated case, a Great Dane banged an elbow on a hard floor. Shortly, the elbow swelled and the dog walked with a limp. A veterinarian diagnosed bursitis of the elbow and drained 13 cc's of fluid from the joint with a syringe. Withdrawing fluid from the joint was required weekly for a month to keep the swelling down. From all appearances. this process would have continued unless the dog were operated on. Instead, the padded protectors of this invention were made and placed on the dog. Shortly, the elbows began to heal and no further difficulty has arisen.

In summary, this invention comprises an apparatus for protecting the front elbows of canines including a first tapered sleeve including a first leg surrounding section having a first lower end providing an opening of a first size and a first upper end providing an opening of a second size larger than the first size, the first upper end providing a notch extending toward the first lower end, a first shoulder covering section joined to the leg surrounding section and extending upwardly therefrom, a second tapered sleeve including a second leg surrounding section having a second lower end providing an opening of a first size and a second upper end providing an opening of a second size larger than the first size, the second upper end providing a notch extending toward the second lower end, a second shoulder covering section joined to the leg surrounding section and extending upwardly therefrom, the first and second tapered sleeves comprising first and second fabric layers and a layer of padding material between the first and second fabric layers in the first and second lower leg surrounding section ends, and a harness connecting the first and second tapered sleeves for extending over the back of an animal.

One object of this invention is to provide a padded protector for the front elbows of an animal.

This and other objects of this invention will become more fully apparent as this description proceeds, reference being made to the accompanying drawing and appended claims.

IN THE DRAWINGS

Figure 1:
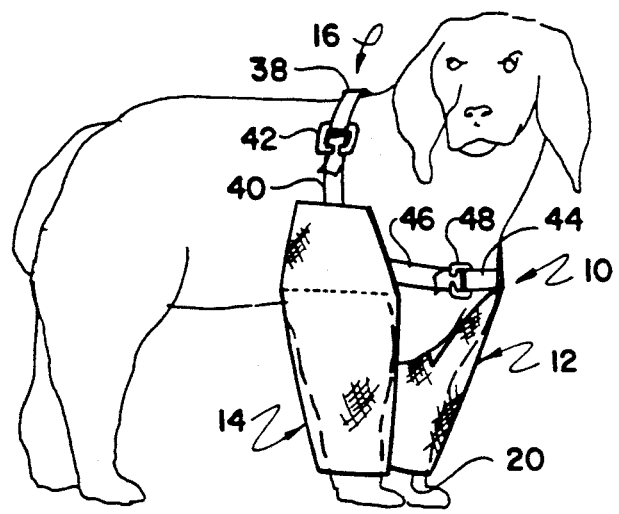
FIG. 1 is a pictorial view of a dog wearing the elbow protectors of this invention.
Figure 2:
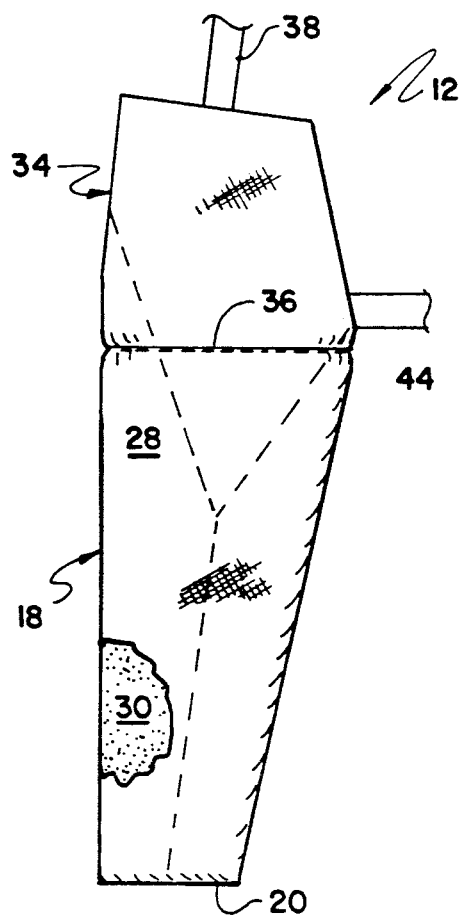
FIG. 2 is an enlarged view, partly in section, of the front of the left elbow protector of FIG. 1.
Figure 3:
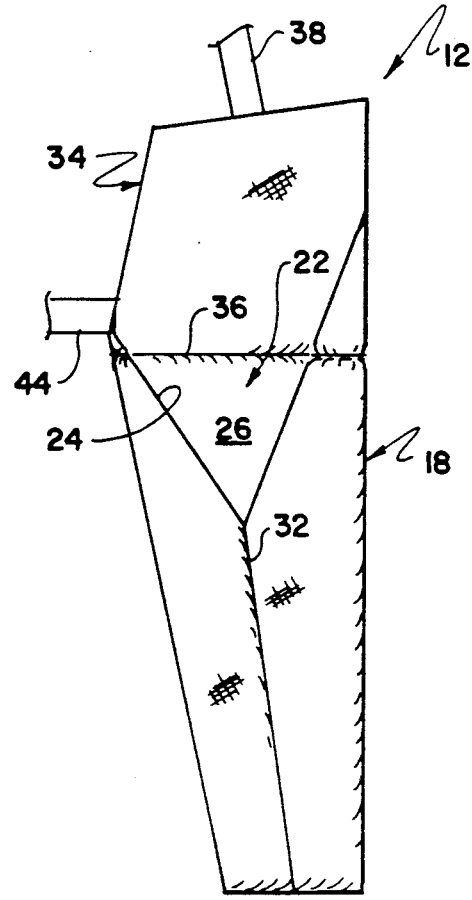
FIG. 3 is an enlarged view of the back of the left elbow protector shown in FIGS. 1 and 2.

Referring to FIG. 1, a dog is shown wearing an elbow protection assembly 10 of this invention. The assembly 10 comprises, as major components, left and right elbow protectors 12, 14 and a harness 16 connecting the left and right elbow protectors 12, 14 and holding them in place on the dog.

The left and right protectors 12, 14 are mirror images of one another. The left protector 12 comprises a tapered leg surrounding section or sleeve 18 having a small open bottom end 20 having a more-or-less circular opening therein and a relatively large open upper end 22 providing a V-shaped opening 24. The leg section 18 is padded, having an internal fabric layer 26, an external fabric layer 28 and a layer 30 of padding material, such as foam rubber. The layers 26, 28, 30 are cut to size and shape and stitched together along a seam 32 and then turned inside out to provide a smooth appearance. The fabric layers 26, 28 may be of any suitable material, although denim is preferred for durability and fashion.

The fabric layers 26, 28 extend above the leg section 18 to an unpadded shoulder section 34 with a stitch line 36 separating the leg section 18 from the shoulder section 34. Thus, the shoulder section 34 includes a pair of fabric layers 26, 28 but no padded layer.

The harness 16 includes a first pair of straps 38, 40 secured to the upper end of the shoulder sections 34 and extending over the back of the dog. A buckle 42 secures the straps 38, 40 together in an adjustable fashion. The harness 16 also includes a second pair of straps 44, 46 secured to the inside of the elbow protectors 12, 14 to extend across the chest of the dog. A buckle 48 secures the straps 44, 46 together in an adjustable fashion.

Use of the elbow protection assembly 10 of this invention should now be apparent. The protectors 12, 14 are slipped onto the dog's legs with the V-shaped openings 24 facing inward. The straps 38, 40 are connected over the top of the dog's back and the straps 44, 46 are connected in front of the dog's chest. This combination holds the protectors 12, 14 in place in an easy, natural manner and the padded sleeves or sections 12, 14 protect the animals elbows. Because of the V-shaped openings 24, the protectors 12, 14 will fit dogs of considerably different size thereby avoiding, to a large extent, different sized assemblies.

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. Apparatus for protecting the front elbows of animals, comprising
   a first tapered sleeve including
      a first leg surrounding section having
         a first lower end providing an opening of a first size and a first upper end providing an opening of a second size larger than the first size, the first upper end providing a notch extending toward the first lower end, a first shoulder covering section joined to the leg surrounding section and extending upwardly therefrom, a second tapered sleeve including a second leg surrounding section having a second lower end providing an opening of a first size and a second upper end providing an opening of a second size larger than the first size of the second lower end, the second upper end providing a notch extending toward the second lower end, a second shoulder covering section joined to the second leg surrounding section and extending upwardly therefrom, the first and second leg surrounding sections comprising first and second fabric layers and a layer of padding material between the first and second fabric layers, and a harness connecting the first and second tapered sleeves for extending over the back of a canine.

2. The apparatus of claim 1 wherein the first and second shoulder sections comprise an upper end and the first and second tapered sections comprise an inner side, and the harness comprises a first pair of straps extending upwardly from the upper end of the first and second shoulder sections and having a first buckle adjustably connecting the first pair of straps and a second pair of straps extending inwardly from the inner side of the first and second tapered sections and having a second buckle adjustably connecting the second pair of straps.

* * * * *